United States Patent [19]

Koslow et al.

[11] 4,437,007
[45] Mar. 13, 1984

[54] LARGE ARRAYS OF DISCRETE IONIZING RADIATION DETECTORS MULTIPLEXED USING FLUORESCENT OPTICAL CONVERTERS

[75] Inventors: Evan E. Koslow, Westport, Conn.; Robert R. Edelman, Brookline, Mass.

[73] Assignee: Koslow Technologies Corporation, Westport, Conn.

[21] Appl. No.: 366,472

[22] Filed: Apr. 18, 1982

[51] Int. Cl.³ .............................................. G01T 1/20
[52] U.S. Cl. ..................................... 250/366; 250/367
[58] Field of Search ........... 250/361 R, 363 R, 363 S, 250/366, 367, 368; 378/165

[56] References Cited

U.S. PATENT DOCUMENTS

| | | | |
|---|---|---|---|
| 3,308,438 | 3/1967 | Spergel et al. | 250/366 |
| 3,717,762 | 2/1973 | Grenier et al. | 250/366 |
| 3,812,361 | 5/1974 | Prag et al. | 250/366 |
| 3,873,838 | 3/1975 | Lee | 250/366 |
| 4,187,427 | 2/1980 | Cusano | 250/366 |

Primary Examiner—Janice A. Howell
Attorney, Agent, or Firm—Parmelee, Bollinger & Bramblett

[57] ABSTRACT

The present invention is a large scintillator array multiplexing apparatus and method in which individual scintillators are coupled to fluorescent optical converters that absorb the light emitted by the scintillators and emit at longer wavelengths. Loss of light is minimized by maximizing total internal reflection of the longer wavelength emissions by the use of reflectors and mirrors. The wavelength-shifted radiation is conducted to electro-optic detectors which, when activated, directly encode the location of the scintillator that has been excited by ionizing radiation. Using this method, scintillator arrays consisting of thousands of individual scintillators can be built without undue complexity or cost and the resolution of the imaging system can be enhanced beyond the range possible using prior art methods.

22 Claims, 9 Drawing Figures

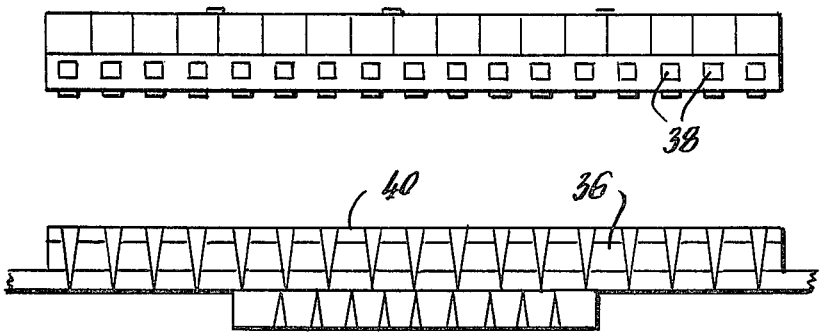
Fig. 3a.
Fig. 3b.
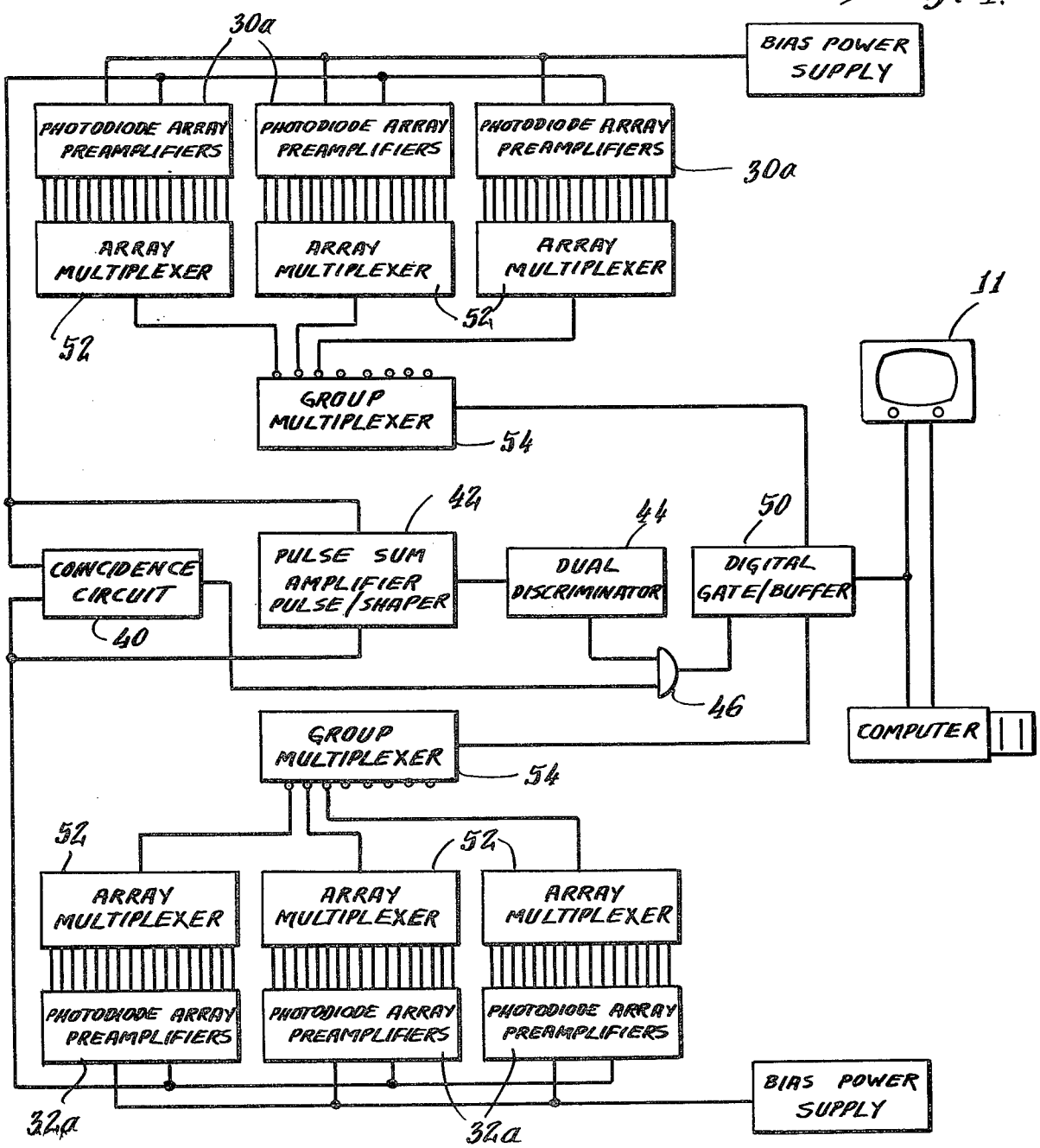
Fig. 4.

LARGE ARRAYS OF DISCRETE IONIZING RADIATION DETECTORS MULTIPLEXED USING FLUORESCENT OPTICAL CONVERTERS

BACKGROUND OF THE INVENTION

This invention relates to radiation imaging methods and systems and, more particularly, to such imaging systems utilizing arrays of scintillation detectors in combination with fluorescent optical converters.

Radiologic and radionuclide imaging have, within the past decade, entered a period of rapid growth and development. Much of this activity is the result of the introduction of computerized tomography and new imaging instruments and methods.

One of the earlier imaging systems, the Anger scintillation camera (U.S. Pat. No. 3,011,057), was introduced in the 1950's and various improvements have been made upon this basic instrument. With the introduction of relatively cheap and high-speed computers, further processing of scintillation camera images to enhance their diagnostic utility has become routine.

The conventional Anger camera consists of an array of photomultipliers coupled via a flat light pipe to a large, thin, flat scintillation crystal which may be, for example, thallium-activated sodium iodide (NAI(Tl)). A collimator is placed in front of the scintillator. Radiation passing through the collimator impinges upon the scintillator and is converted into optical radiation whose spectrum extends from the ultraviolet to the blue portion of the visible spectrum. This optical radiation then passes via a fiber optic coupling into photomultipler detectors where it is converted into electrical signals whose summed pulse-height voltage is proportional to the energy of the absorbed ionizing radiation photon. The position of the scintillation event is estimated by mixing the individual pulse-height amplitudes from the photomultipliers.

Any detector used for radionuclide imaging must be capable of meeting certain requirements which are:

(1) High spatial resolution in determining the position of the scintillation event;

(2) Sufficient energy resolution to identify and reject gamma-photons that have been scattered in the source or in the collimator (source scatter rejection) as well as within the detector itself (detector scatter);

(3) A reasonable count rate and low dead time;

(4) A reasonable gamma-ray absorption efficiency for the detector (minimum signal loss).

In addition to the above, there are a number of attributes that would be desirable in an imaging system but are often not obtainable which include:

(1) The capability of rejecting gamma-photons that are scattered within the scintillator and subsequently reabsorbed in some other portion of the scintillator;

(2) The capability of using thick scintillators to increase incident gamma-photon adsorption rates without significant deterioration in spatial resolution;

(3) The ability of providing digital information for computer storage and processing;

(4) An immunity from drift and instability over time, and inhomogeneity across the face of the detector.

These desirable qualities, along with lower cost, simplified operation, and higher efficiency (in the sense of image quality for a given quantity of radionuclide administered to the patient), have been sought through the use of several alternative imaging schemes. One approach is embodied by the autofluoroscope. This device uses light pipes to couple individual scintillators to an array of photomultipliers and includes several hundred individual scintillators. Similar devices have been constructed as planar arrays for scintigraphy or ring cameras for position emission tomography imaging.

The autofluoroscope and similar devices suffer from several problems. One is that the transmission of light from the scintillator, through the light pipes, to the photomultipliers is inefficient and nonuniform. This results in poor energy resolution and poor source scatter rejection. In addition, such devices are exceedingly complex because each scintillator element must be individually and reproducibly coupled to a light pipe and a light conducting "spatula" resulting in 315 light conduits for an array of 294 scintillators. The number of photomultipliers required to address even a moderate size system of this type remains large.

SUMMARY

Accordingly it is an object of the present invention to provide a new and improved radiation imaging system employing comparatively large arrays of scintillators. Another object is to produce a detector with high spatial resolution, high gamma-photon absorption efficiency, excellent source and detector scatter rejection, and costing considerably less than conventional detectors because of its capacity to utilize low-cost solid-state opto-electronic devices rather than expensive photomultipliers. Other objects, features, and advantages will become apparent from the following description and appended claims.

In carrying out this invention in one illustrative embodiment thereof, a radiation detection and conversion apparatus is provided having an array of individually optically isolated radiation-sensitive elements that emit optical radiation upon absorption of ionizing radiation. An array of channels, comprising a material that absorbs and traps the radiation emitted by the radiation-sensitive elements and transports it, or radiation that has been shifted to a longer wavelength, is placed in proximity to the radiation-sensitive elements. Electro-optical detectors that convert the transported radiation into electrical signals are coupled to the channels. The activation of one of the electro-optical devices for radiation from one of the channels indicates than at least one of the radiation-sensitive elements proximate to that channel has absorbed a quantity of ionizing radiation.

BRIEF DESCRIPTION OF THE DRAWINGS

The invention, together with aspects, objects, advantages and features will be more fully understood from the following description taken in conjunction with the accompanying drawings, in which like elements will bear the same reference numerals.

FIGS. 3a and 3b illustrate the detector-preamplifier array as for the systems shown in FIG. 1;

FIG. 4 is a block diagram of an illustrative example of one form of signal processing for the scintillation detector array of FIG. 1;

DESCRIPTION OF THE PREFERRED EMBODIMENT

Figure 1:
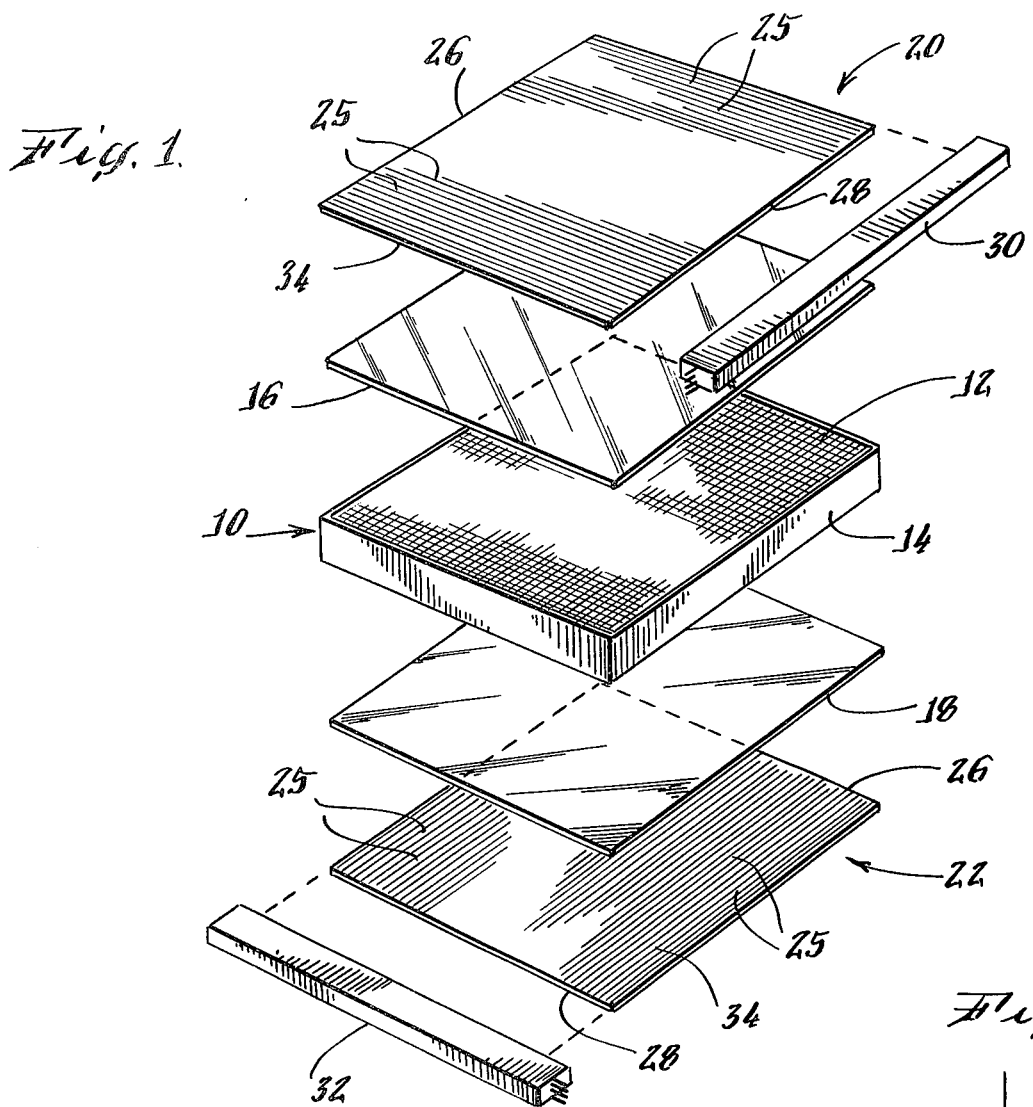
FIG. 1 is an exploded perspective view of an illustrative embodiment of the scintillation detector array of the present invention in which the scintillators are arranged in a rectangular array and placed in proximity to strips of luminescent light collector (LLC) material. The strips of LLC material on top of the scintillator array are aligned in one direction (for example along the X-axis) while the strips of LLC material on the bottom of the scintillator array are aligned in an orthogonal direction (in the Y-axis).

Referring now to FIG. 1, a scintillator array, referred to generally with the reference character 10, is made up of a plurality of conventional scintillator detector crystals 12 which are housed in an array frame 14. Flat glass or fused silica plates 16 and 18 are interposed between the ends of the scintillator detectors 12 and the luminescent light collector (LLC) arrays 20 and 22, respectively, each of which is composed of a plurality of luminescent light collectors 25. The collectors 25 are rods forming light-conducting channels. The ends of the scintillator detectors 12 are optically coupled to one side of the plates 16 and 18. The opposite sides of plates 16 and 18 facing LLC arrays 20 and 22, respectively, may have an anti-reflection coating and the plates are separated from the LLC arrays by a thin air gap. Plates 16 and 18 serve to seal the scintillator detector array 10 from contact with the surrounding environment. The LLC channels 25 of array 20 are aligned in the X-direction and the channels 25 of array 22 are aligned in the Y-direction.

Figure 7:
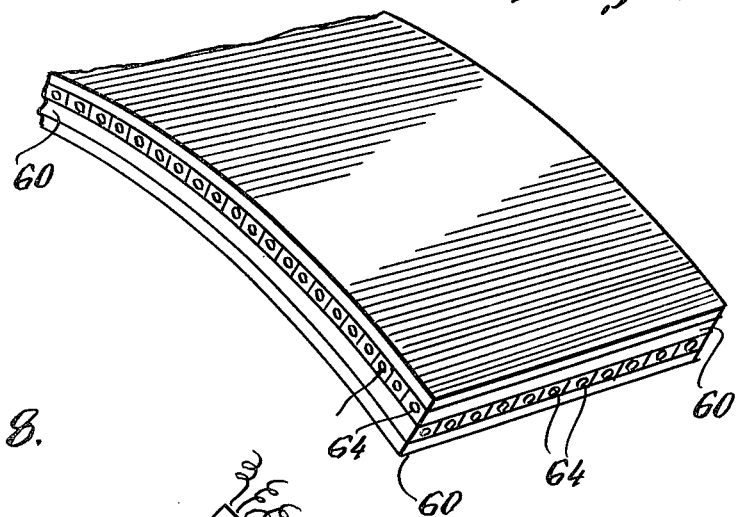
FIG. 7 illustrates a curved array.

Although the components in FIG. 1 are illustrated in flat, rectangular form for purposes of illustration, it will be understood that the elements may be formed in curved arrays, e.g. as shown in FIG. 7, so that they may be used in such applications as positron ring cameras, emission tomography, and computerized tomography.

LLC 25 is a device in the form of a solid rod or channel composed of plastic, quartz, or glass doped with, or coated with, one or more fluorescent dyes that absorb light in one wavelength and emit light at some longer wavelength. Alternatively, it may be a tube filled with a solvent containing the desired dyes. The dyes may be laser dyes such as rhodamine or coumarin which are mixed with the physical medium making up the LLC or are formulated as a coating that is applied to the surface of the device. Three surfaces of the LLC rods 25 are surrounded with a diffuse reflecting material while the fourth surface facing the scintillation detector array 10 is coated with a mixture of the fluorescent dyes. In some cases, the shifting of the wavelength can be carried out by surrounding the scintillators with a dye-containing medium. In some cases, the LLCs are simply tubes surrounded on three sides with diffuse reflectors. At ends 26 the LLC arrays are terminated by a reflector usually separated by a narrow air gap. The other ends 28 are optically coupled to suitable electro-optic devices such as photodiode arrays 30 and 32.

The light emitted by the fluorescent dyes is trapped by specular (total internal) reflection within an angle defined by Snell's law (depending upon the index of refraction of the LLC medium). The trapped radiation is, therefore, transmitted by successive reflections to the edges 28 of the LLC arrays 20 and 22 where photodiode arrays 30 and 32 are used to convert it into electrical signals based on the intensity of the received radiation.

Optical cross-talk between the individual scintillator detectors 12 in the array 10 is prevented, and improved extraction of light from the individual scintillator detectors is provided, by an optically reflective medium placed between the individual crystals or coated onto their surfaces. Barium sulfate or magnesium oxide diffuse reflectors are suitable for this purpose. The ends of the scintillator detector 12 facing the LLC channels 25 can be polished and coupled to the glass or fused silica plates 16 and 18 that seal the array 12. The plates may be coated with an anti-reflection coating and the LLC channels 25 adjacent the plates 16 and 18 are separated therefrom by a narrow air gap. Light emitted when a scintillator 12 absorbs a radiation stimulus travels to the ends of the scintillator, through the glass end plates 16 and 18 and into LLCs 20 and 22 where it is absorbed and re-emitted at longer wavelengths. Alternatively, the light is shifted in wavelengths within the scintillator by surrounding the scintillators with a wavelength shifting medium. This shifted radiation is then transmitted to the LLC rods which trap the radiation.

The LLC strips 25 are normally sized to the same width as the scintillators 12 used in the array 10 and each is aligned with a row of scintillators. In addition, the surfaces of the LLC strips 25 facing the scintillator array 10 may be coated with a special dielectric mirror coating 34. This coating allows the emission from the scintillator (short wavelength optical radiation) to pass through into the LLC strip 25 but reflects essentially all of the light re-emitted at longer wavelengths by the dyes within the LLC (see FIG. 2). Hence, light absorbed and re-emitted within the LLC 25 becomes trapped within the LLC and cannot pass back into the scintillator array 10. The sides of the LLC not facing the scintillator array are surrounded by a diffuse reflecting material such as that surrounding the scintillators.

Figure 2:
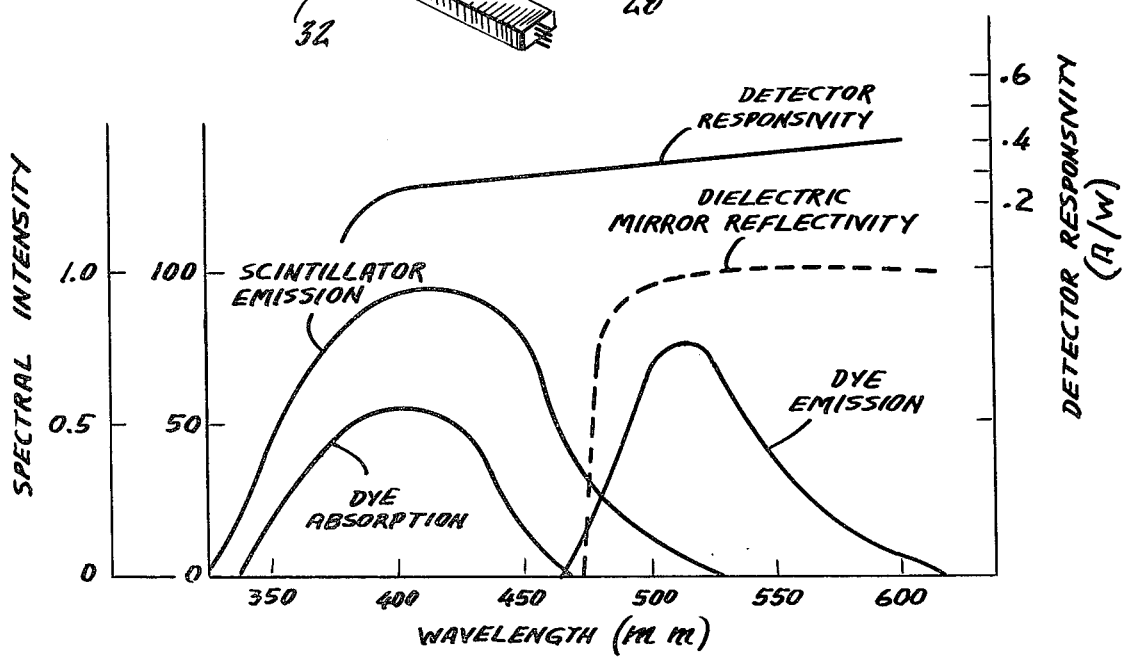
FIG. 2 shows graphs of intensity and detector responsivity vs. wavelength related to the various components of the array shown in FIG. 1.

FIG. 2 shows the spectral properties of the light emitted by the scintillators (assumed to be NaI(Tl)), the absorption and emission spectra of the LLC dyes, the reflectivity of a dielectric mirror placed between the LLCs and the plate used to seal the scintillator array, and the photodiode responsivity. The device is designed to optimize the relationships between these different spectra. Hence, the selection of scintillator, dielectic mirror, LLC dyes, and photodetector is dictated by their being matched in such a manner as to capture and transport efficiently, without losses, radiation from the scintillator to the photodetector and to maximize the photodetector's response to radiation emitted by the dyes in the LLC channel.

Figure 8:
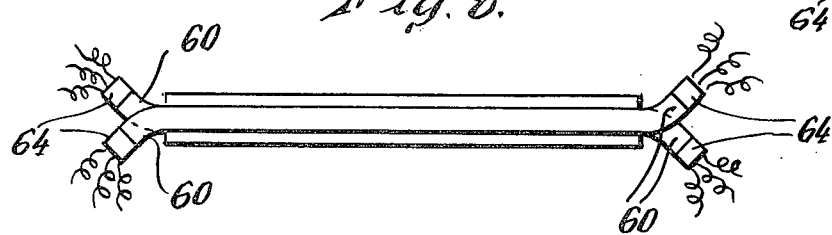
FIG. 8 shows an array having alternate channel ends bent oppositely.

In order to obtain close packing of the LLC channels while avoiding excessing crowding of the electro-optical detectors in arrays 30 and 31 at the ends of the LLCs 25, the ends of the LLC channels can be modified by being curved or bent, e.g. as shown in FIG. 8. This would allow alternate placement of the electro-optic devices above and below the plane defined by the LLC channels.

Light trapped within the LLC strips is transported to electro-optic detectors 30 and 32 that absorb the light and convert it into electrical signals proportional to the number of photons emitted by the scintillator. These detectors can be arranged in compact arrays and can be cooled, for example, by Peltier cooling modules 36 (see FIG. 3b) to further reduce noise. Thus, when a single scintillator detector 25 emits a pulse of light, the light passes to two adjacent LLC channels where it is absorbed and re-emitted at a radiation wavelength that becomes trapped within the LLC channel. The wavelength-shifted light is transported to the ends of the LLC channels 25 to activate electro-optic detectors 30 and 32 located there. Thus, when particular electro-optic devices detect pulses of light, the position of the emitting scintillator is encoded in X- and Y-coordinates, and the sum of the measured electrical pulses from the electro-optic detectors is proportional to the energy of the original gamma-photon.

One of the major advantages of the above configuration is that small and low-cost solid-state electro-optic detectors can be used rather than much more expensive photomultiplier detectors. This is due to the fact that light emitted by the scintillators remains confined to the narrow LLC channels, thus obviating the need for large active area, low-noise, detectors such as photomultipliers. Instead, small discrete photosensitive devices with small active areas and low noise can be used. In addition, the solid-state devices can be designed to include the electronics required to amplify, analyze, and encode the signal.

The use of the above device involving discrete scintillator elements, provides the means to obtain devices with previously unobtainable spatial resolution. In addition, the light emitted by the scintillator can be transported to the photodetectors with surprisingly high efficiency (approaching 50-60%) so that the energy of the incident gamma-photon can be accurately measured to allow scatter rejection. In addition, when a gamma-photon is scattered within one scintillator and subsequently re-absorbed by a second scintillator within the array, the resulting signal can be rejected because more than the allowed number of electro-optic detectors would respond.

This capacity to reject detector scatter allows the use of thick scintillation crystals without a substantial decline in image quality. The efficiency of gamma-photon absorption by the present invention can therefore be greater than that of conventional systems and allows this device to detect radionuclides of varying energy without a substantial change in image quality and to produce a clinically useful image in a minimum amount of time and with a minimum dose of radiation given to the subject.

A second configuration involves the use of two groups of orthogonally aligned LLC channels but arranged to have both groups of LLC channels on the same side of the scintillator array. In that case, the first group of channels can be designed to absorb a substantial portion of the radiation emitted by the scintillator while allowing the remaining radiation to pass to or re-emitting a portion of the radiation at a longer wavelength to the second group of LLC channels located directly behind the first group. The advantage of this configuration is that the device is generally more compact and does not have a group of LLC channels blocking the passage of gamma-photons into the scintillator array. The major problem with this approach is that it is sometimes more difficult to prevent cross talk between LLC channels and there can be greater losses of the light emitted by the scintillators.

A third configuration uses a single group of LLC channels 25 connected to the bottom of the scintillator array 10 with an electro-optic device at one end of each LLC channel. This configuration is designed to take advantage of the fact that an X-ray fan beam, oriented perpendicularly to the long axis of the LLC channels, inherently determines one of the position coordinates of the scintillation detectors 12. This configuration would be preferred for CAT scanning and digital radiography.

As an illustrative embodiment of a radionuclide imaging system, a scintillator array may be composed of 16,384 assembled individual crystals. Each scintillator is 2×2×25 millimeters and is optically isolated from adjacent scintillators through the use of diffuse reflecting materials separated from the crystals by a narrow gap. Such scintillators are most conveniently manufactured by extrusion. The scintillators are arranged in a matrix of 128×128 to form a block roughly 10×10 inches and one-inch thick. The LLC channels are composed of 2×2×260 millimeter rods of optically transparent, thin-walled glass or fused silica.

In the present invention, the light emitted by the scintillators is confined to narrow channels so that a photodetector having a very small sensitive area (preferably less than 25 square millimeters) can be used. When the sensitive area of the detector is limited in size, the noise from the detector decreases. Even so, most solid-state photo-detectors are not suitable because they have relatively high dark current and noise. Small PIN silicon photodiodes have low dark current and noise and accordingly can be used directly, usually without the need to be cooled, by being coupled to the ends of the LLC strips. The performance of these detectors can be further enhanced by including a low-noise preamplifier 38 (see FIGS. 3a and 3b) directly on a photodiode silicon chip 40 and cooling the chip 40 using thermoelectric (Peltier) modules 36. It is also advisable to arrange the photodiodes as large arrays on a single chip to reduce costs and simplify coupling the many LLC channels. In one illustrative embodiment of a scintillator array the detector specifications are:

| | |
|---|---|
| photodiode active area | 2.1 × 2.1 mm |
| photodiode dark current (room temp.) | 0.8 nA |
| photodiode dark current (−50C.) | 6 pA |
| responsivity (at 5100 angstroms) | 0.4 A/W |
| number of photodiodes/array | 16 |
| number of photodiode arrays in group | 6 |
| total number of photodiodes in group | 128 |
| preamplifier gain | approx. 1000 |

Optimally, it would be best to heat the scintillators within the array because their quantum yield usually increases and relaxation times decrease with temperature. In the case of the present invention, the simultaneous heating of the scintillators and cooling of the photo-detectors becomes possible because they are physically isolated from each other by the LLC channels. Such temperature control can significantly improve the performmance of the device as compared to operating the entire system at ambient temperature.

The signal from the electro-optic devices can be handled using conventional methods as, for example, illustrated in FIG. 4. Each detector in the detector array can include a preamplifier and other electronics for signal processing which are arranged in groups and identified in FIG. 4 with the reference numerals 30a and 32a corresponding to detector arrays 30 and 32 of FIG. 1. The signals from LLCs 20 and detectors 30a are checked by a coincidence circuit 40 for coincidence with a pulse arising from the electro-optic detectors 32a coupled to the second group of LLC channels 22 located on the other side of the scintillator array 10. In addition, coincidence circuit 40 rejects signals that occur when more than one scintillator is emitting at a given moment. Once these coincidence and anticoincidence checks have been made, the signals from the electro-optic devices 30a and 32a are summed and amplified in a pulse sum-pulse shaper circuit 42 to provide the pulse-height of the scintillation event. If the pulse height, which is applied to a dual discriminator 44, is within a given range, the position of the activated scintillator element, given as the X- and Y-coordinates of the activated photodetectors, is transmitted in digital form through AND gate 46 and digital gate-buffer 50 to a recording device and/or display 11. The detector-amplifiers 30a and 32a are individually multiplexed or sampled by array multiplexers 52 and group multiplexers 54.

Apparatus of the type described above can be designed to perform various tasks. For example, the array may be curved to form a ring and the LLCs placed adjacent to the detector elements of the curved array. Such a device can be used as a positron ring camera, in emission tomography, in digital radiography, or computerized tomography to carry out scans without the need for physically moving individual detectors and for gathering information from several projections simultaneously. Alternatively, the scintillators can be coupled to a single group of LLC rods aligned in a single direction while the array of scintillators is exposed to a fan beam of X-rays that define the orthogonal coordinate. In such a case, only a single group of LLC rods is required to assay the radiation being received by the elements within the array.

Another application of this apparatus is in cardiac and respiratory scanning systems that monitor rapidly changing spatial distributions of radionuclide-labeled materials. In addition, the present invention may be applied in fluoroscopy, or to monitor the exposure of standard radiological X-ray film to obtain optimized exposures.

Figure 5:
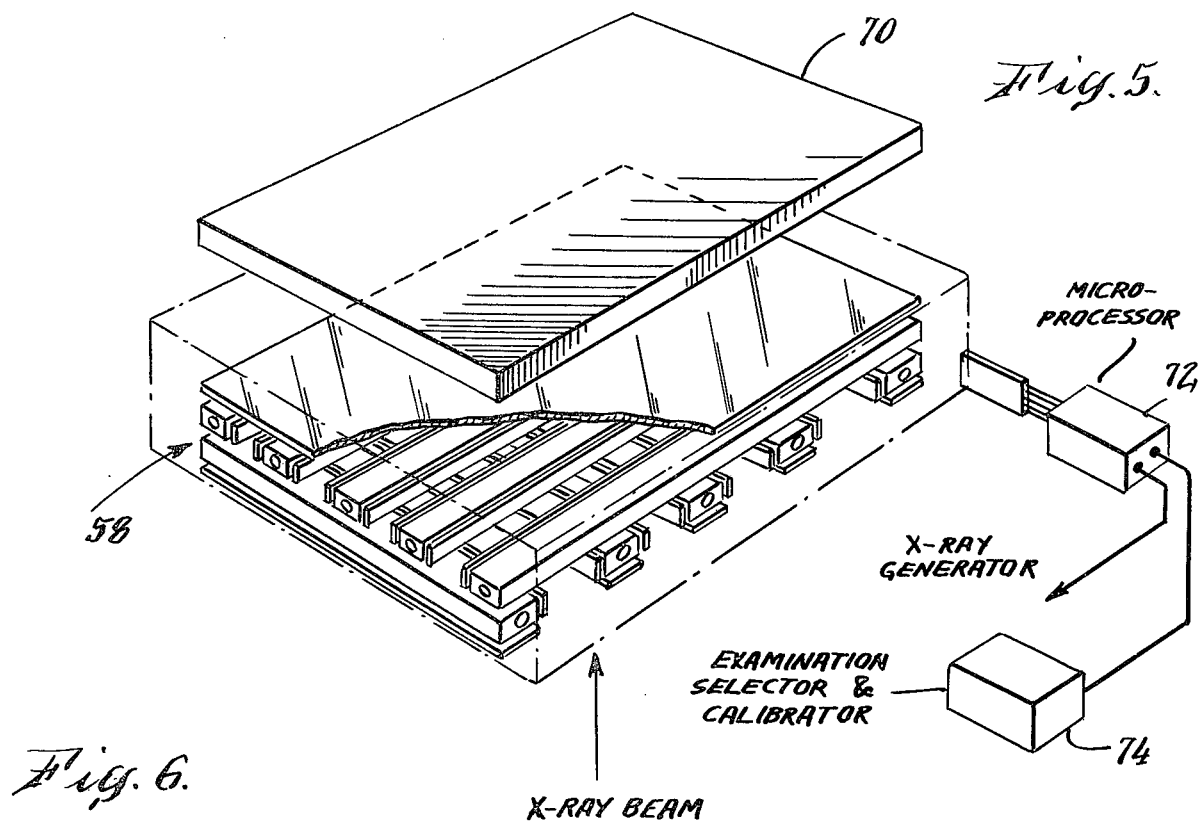
FIG. 5 is a perspective view, partially broken away, of a modified form of the invention.
Figure 6:
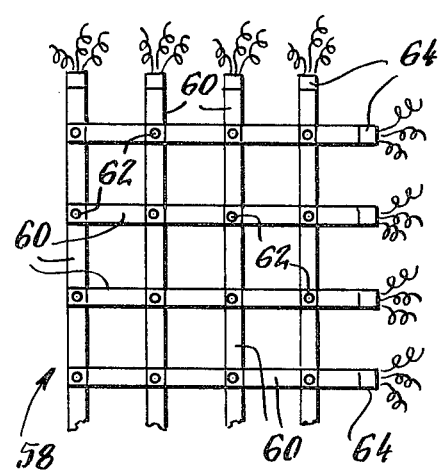
FIG. 6 is a partial top view of an array employed in the modificatiion of FIG. 5.

FIGS. 5 and 6 illustrate the present invention applied to the control of X-ray film exposure. In FIG. 6, a matrix 58 of rods or LLC channels 60 are configured in an orthogonal array with one group of spaced, parallel channels aligned in the "X direction" and another group of spaced, parallel channels aligned in the "Y direction". At the intersections of channels 60, a small amount of powdered or thin plastic scintillator 62 is applied to the upper surface of the channel positioned nearest the radiation. Scintillators 62 convert a small amount of incident ionizing radiation into pulses of light that are transmitted by the LLC channels to photodetectors 64 positioned at the ends of the channels which will identify the position of the intercepted radiation.

An alternative configuration to that presented above is a single group of LLC channels with a small amount of powdered or thin plastic scintillator 62 applied to the upper surface of the channel positioned nearest the radiation, at only a single location on each LLC channel. As in the above configuration, photodetectors are positioned at one end of each LLC channel. This configuration has the advantage of high speed of response and wider exposure attitude.

In FIG. 5 the above described matrix 58 is placed adjacent to a conventional X-ray film-screen unit 70 and is exposed to X-ray radiation which subsequently impinges upon the unit 70. The signals generated by photodiodes positioned on the ends of the LLC channels 60 are multiplexed to identify the source of the pulse from the X and Y groups of channels 60 and are applied to a micro-processor 72 where the information is encoded and recorded. When the micro-processor 72, through an algorithm applied thereto by an examination selector and calibrator 74 has observed the desired distribution of recorded radiation at the various intersections of the LLC channels spanning the X-ray film in the unit 70, an automatic signal is generated by the micro-processor 72 to stop the exposure of the X-ray film in unit 70.

Alternatively, the exposure controller can be constructed from an array of LLC rods aligned in a single direction but with the scintillators positioned at different points along their lengths to sample throughout the area being monitored. Normally, such an approach is not desirable because of the large number of LLC rods and photodetectors required, but in this case, only a limited number of points need be sampled to derive an accurate measure of the exposure being received by the X-ray film. A one dimension array may also be sampled with a second coordinate defined by fan shaped scanning beam.

The present invention may be used in biological and chemical research to scan thin-layer chromatograms or electrophoretic gels or strips for radioactively labeled compounds. Other applications include a wide range of instruments used in applications such as X-ray telescopes, mass spectrometers, X-ray fluorescence spectrometers, time-of-flight spectrometers, or other systems that benefit from array processing of ionizing radiation or particles. The present invention is very versatile due to its ability to utilize large array and digital processing technology.

Since other modifications and changes varied to fit particular operating requirements and environments will be apparent to those skilled in the art, the invention is not considered limited to the examples chosen for purposes of illustration and includes all changes and modifications which do not constitute a departure from the true spirit and scope of this invention.

What is claimed is:

1. A radiation detection and conversion apparatus comprising:
    an array of individual, optically isolated, radiation sensitive elements that emit optical radiation upon absorption of radiation stimuli;
    an array of elongated, parallel channel means, each of said channel means being positioned to receive and trap optical radiation emitted by a plurality of said radiation sensitive elements and transporting said optical radiation therealong;
    an array of electro-optical devices coupled to at least one end of said channels for converting the transported radiation into electrical signals whereby each such electrical signal indicates that at least one of said radiation sensitive elements has absorbed a radiation stimulus.

2. The apparatus of claim 1 wherein said array of channels comprises at least two groups of orthogonally positioned channels, each of said radiation sensitive elements being placed adjacent to at least one of said orthogonal channels, said orthogonal channels having one or more of said electro-optical devices optically coupled to the ends thereof, whereby, the activation of a particular set of said electro-optical devices, encodes the location of the radiation sensitive element that has absorbed a quantity of ionizing radiation.

3. The apparatus of claim 1 wherein said array of channels comprises at least two groups of channels having an angular orientation with respect to each other which differs from 90°.

4. The apparatus of claim 2 wherein said array of channels are aligned on opposite ends of said array of radiation sensitive elements.

5. The apparatus of claims 2 or 3, wherein said groups of channels are positioned on the same side of said array of radiation sensitive elements, a first group of said channels being directly adjacent to said radiation sensitive elements and capable of absorbing only a portion of the optical radiation emitted by said array and allowing a substantial amount of the radiation emitted by radiation sensitive elements within said array to pass into a second group of said channels.

6. The apparatus of claim 1 wherein each channel in said array of channels has reflective material on areas of the periphery thereof.

7. The apparatus of claim 1 wherein said array of channels includes fluorescent dye-containing media that absorbs radiation emitted from said radiation sensitive elements and shifts such radiation to longer wavelengths which becomes trapped within said channels.

8. The apparatus of claim 1 in which a dye medium is interposed between said radiation sensitive elements and said array of channels.

9. The apparatus of claim 7 wherein the portion of said array of channels facing said array of radiation sensitive elements selectively transmits in the wavelength where said radiation sensitive elements emit and efficiently reflects at the wavelengths where the fluorescent dyes emit.

10. The apparatus of claim 7 wherein said channels are thin-walled tubes containing a fluid comprising a solvent carrying one or more fluorescent dyes.

11. The apparatus of claim 7 wherein said channels are plastic, glass, quartz or some other optically transparent material coated with a fluorescent dye-containing medium that absorbs radiation at short wavelengths and emits radiation at some longer wavelength.

12. The apparatus of claim 7 wherein said channels are comprised of solid rods having an optically transparent medium containing fluorescent dyes that absorb radiation in a short wavelength and emit radiation in a longer wavelength.

13. The apparatus of claims 7 or 8 wherein said channels are elongated rectangles approximately the same width as elements in said array of radiation sensitive elements.

14. The apparatus of claims 7 or 8 wherein said channels are curved or bent at their ends so as to allow close packing of said channels by alternately pointing the bent section of the channels upward and downward to expand the space available for said electro-optical devices coupled to the ends of said channels.

15. The apparatus of claim 1 wherein one or more channels in said array of channels is curved.

16. The apparatus of claim 1 wherein said radiation sensitive elements are scintillators.

17. The apparatus of claim 1 wherein said radiation sensitive elements of said array are selected from the group comprising CsI(Tl), NaI(Tl), CsI(Na), bismuth germanate, plastic scintillators, organic scintillators, liquid scintillators, and liquid scintillators containing heavy metal compounds.

18. The apparatus of claims 1 or 2 wherein said electro-optical devices are solid-state PIN silicon photodiodes having active surface areas of less than 25 square millimeters.

19. The apparatus of claims 1 or 2 wheerein said electro-optical devices are optically coupled to several channels in such a manner to encode the identity of the channel that has transported the radiation emitted by the radiation sensitive element in the array exposed to ionizing radiation.

20. The apparatus set forth in claim 1 wherein said array of elongated, parallel channels are spaced and arranged in a predetermined pattern and said array of radiation sensitive elements are located in said predetermined pattern and coupling said pattern of said array of channels to an X-ray film being exposed for monitoring the exposure of said X-ray film.

21. The apparatus set forth in claim 1 in which said arrays of radiation sensitive elements, channels and electro-optical devices are curved arrays.

22. The apparatus set forth in claim 1 in which said arrays of radiation sensitive elements, channels and electro-optical devices are ring-shaped arrays.

* * * * *